(12) United States Patent
Zhao et al.

(10) Patent No.: US 10,710,708 B2
(45) Date of Patent: Jul. 14, 2020

(54) LANDING GEAR AND AN AERIAL VEHICLE USING THE SAME

(71) Applicant: SZ DJI TECHNOLOGY CO., LTD., Shenzhen (CN)

(72) Inventors: Xifeng Zhao, Shenzhen (CN); Weidong Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 544 days.

(21) Appl. No.: 15/603,584

(22) Filed: May 24, 2017

(65) Prior Publication Data

US 2017/0253324 A1    Sep. 7, 2017

Related U.S. Application Data

(63) Continuation of application No. PCT/CN2014/092275, filed on Nov. 26, 2014.

(51) Int. Cl.
| | | |
|---|---|---|
| *B64C 25/00* | (2006.01) | |
| *B64C 25/10* | (2006.01) | |
| *B64C 25/12* | (2006.01) | |
| *B64C 25/18* | (2006.01) | |
| *B64C 25/20* | (2006.01) | |

(52) U.S. Cl.
CPC ............. *B64C 25/20* (2013.01); *B64C 25/00* (2013.01); *B64C 25/10* (2013.01); *B64C 25/12* (2013.01); *B64C 25/18* (2013.01)

(58) Field of Classification Search
CPC ......... B64C 25/10; B64C 25/12; B64C 25/14; B64C 25/18; B64C 25/20; B64C 25/00; B64D 27/26

USPC .......................................... 244/100 R, 102 R
See application file for complete search history.

(56) References Cited

U.S. PATENT DOCUMENTS

| | | | |
|---|---|---|---|
| 1,485,775 A | | 3/1924 | Fales |
| 2,014,777 A | * | 9/1935 | Payne .................... B64C 25/10 |
| | | | 244/102 R |
| 2,130,914 A | | 9/1938 | Warren |
| (Continued) | | | |

FOREIGN PATENT DOCUMENTS

| | | |
|---|---|---|
| CN | 203047530 U | 7/2013 |
| CN | 203246584 U | 10/2013 |
| CN | 103863559 A | 6/2014 |
| (Continued) | | |

OTHER PUBLICATIONS

The World Intellectual Property Organization (WIPO) International Search Report for PCT/CN2014/092275 dated Jun. 19, 2015 6 Pages.

*Primary Examiner* — Richard R. Green
*Assistant Examiner* — Steven J Shur
(74) *Attorney, Agent, or Firm* — Anova Law Group, PLLC (57) ABSTRACT

A landing gear includes a fixing mechanism, a driving mechanism disposed on the fixing mechanism, a translating member connected to the driving mechanism and configured to move relative to the fix mechanism whey being driven by the driving mechanism, and two supporting feet disposed opposite to each other. The two supporting feet are pivotally connected to the fixing mechanism and movably connected at two ends of the translating member. The driving mechanism is configured to drive the two supporting feet through the translating member to rotate relative to the fixing mechanism.

14 Claims, 5 Drawing Sheets

(56) References Cited

U.S. PATENT DOCUMENTS

| | | |
|---|---|---|
| 2,181,949 A | 12/1939 | Mercier |
| 3,029,047 A | 4/1962 | Jacobsen et al. |

FOREIGN PATENT DOCUMENTS

| | | | | |
|---|---|---|---|---|
| DE | 1106186 B | | 5/1961 | |
| GB | 468256 A | * | 7/1937 | ............ B64C 25/20 |
| JP | S5019182 U | | 3/1975 | |
| JP | 2008543630 A | | 12/2008 | |
| KR | 20120037584 A | | 4/2012 | |

* cited by examiner

LANDING GEAR AND AN AERIAL VEHICLE USING THE SAME

CROSS-REFERENCE TO RELATED APPLICATION

This is a continuation application of International Application No. PCT/CN2014/092275, filed on Nov. 26, 2014, the entire contents of which are incorporated herein by reference.

TECHNICAL FIELD

The present disclosure relates to a landing gear and an aerial vehicle using the same.

BACKGROUND

With the development of science and technology, the technology of air photography is increasingly blooming. In particular, aerial photography using an unmanned aerial vehicle becomes increasingly favored by photographers due to its lower cost and higher security than using a n aimed aerial vehicle. The unmanned aerial vehicle generally carries an image capturing device, such as a video camera, a camera or the like, to perform photography. The unmanned aerial vehicle may typically comprise a vehicle body and a landing gear mounted thereon. The landing gear may comprise at least two supporting feet which are generally in foldable structures in order to avoid blocking a lens of the image capturing device. While the unmanned aerial vehicle is in use, at least two driving members disposed on the vehicle body may drive the at least two supporting feet to expand or fold, respectively. However, the above-described unmanned aerial vehicle has a high manufacturing cost and large weight due to the at least two driving members, and a short cruising endurance in the air.

SUMMARY

In view of the above-described conditions, there is a need to provide a landing gear with a compact structure and a relatively lighter weight as well as an aerial vehicle using the same.

In accordance with the present disclosure, there is provided a landing gear including, a fixing mechanism, a driving mechanism disposed on the fixing mechanism, a translating member connected to the driving mechanism and configured to move relative to the fixing mechanism when being driven by the driving mechanism, and two supporting feet disposed opposite to each other. The two supporting feet are pivotally connected to the fixing mechanism and movably connected at two ends of the translating member. The driving mechanism is configured to drive the two supporting feet through the translating member to rotate relative to the fixing mechanism.

In some embodiments, the landing gear further includes sliding members each connected to one of the supporting feet. The translating member includes at least one guiding groove. Each of the sliding members is inserted in one of the at least one guiding groove and is configured to slide along the one of the at least one guiding groove.

In some embodiments, the landing gear further includes two pivoting members. One end of each of the pivoting members is pivotedly connected to the fixing mechanism, and another end of the pivoting member is connected to one of the sliding members. Each of the supporting feet is pivotedly connected with the fixing mechanism through one of the two pivoting members and slidably connected with the translating member through the one of the two pivoting members and the corresponding sliding member.

In some embodiments, the fixing mechanism includes a mounting member connected to the driving mechanism and two connectors disposed at two ends of the mounting member. Each of the pivoting, members is pivotedly connected to one of the connectors. The translating member is disposed adjacent to the mounting member and configured to move away from or approach the mounting member when being driven by the driving mechanism.

In some embodiments, the fixing mechanism includes a supporting member and a guiding member disposed on the supporting member. The translating member is slidably sleeved on the guiding member. The driving mechanism is mounted on the supporting member and configured to drive the translating member to slide along the guiding member.

In some embodiments, the fixing mechanism further includes a mounting member connected to the driving mechanism and two connectors disposed at two ends of the mounting member. Each of the supporting feet is pivotedly connected to one of the connectors. The supporting member is connected to the mounting member. The guiding member is perpendicular to the mounting member. The translating member is configured to slide along the guiding member to move away from or approach the mounting member.

In some embodiments, the driving mechanism includes a driving member disposed on the fixing mechanism, a first connecting rod disposed on the driving member, and a second connecting rod. One end of the second connecting rod is pivotedly connected with the first connecting rod and another end of the second connecting rod is pivotedly connected with the translating member.

In some embodiments, the supporting member includes a mounting portion disposed on the mounting member and two supporting portions formed at two ends of the mounting portion, respectively. The translating member is disposed between the two supporting portions. The driving member is mounted on one of the two supporting portions. The driving mechanism further includes a third connecting rod rotatably disposed on another one of the two supporting portions and a fourth connecting rod having one end pivotedly connected with the third connecting rod and another end pivotedly connected with the translating member.

In some embodiments, the driving mechanism further includes a driving member disposed on the fixing mechanism, a cam disposed on the driving member, and a reset resilient member. A peripheral wall of the cam is movably abutted on the translating member. One end of the reset resilient member is connected to the fixing mechanism and another end of the reset resilient member connected to the translating member. The translating member is configured to abut against the peripheral wall of the cam.

In some embodiments, the driving mechanism includes a driving member disposed on the fixing mechanism, a gear disposed on the driving member, and a rack disposed on and fixed relative to the translating member and engaged with the gear.

In some embodiments, the driving mechanism includes a driving member disposed on the fixing mechanism, a lead screw connected with the driving member, and a nut sleeved on the lead screw and fixed relatively with the translating member.

In some embodiments, the driving mechanism includes a linear motor including stator disposed on the fixing mechanism and a rotator slidably disposed on the stator and relatively fixed with the translating member. The linear motor is configured to drive the translating member to move relative to the fixing mechanism.

In some embodiments, the driving mechanism includes an air cylinder. A driving end of the air cylinder is connected with the translating member and configured to drive the translating member to move relative the fixing mechanism.

Also in accordance with the present disclosure, there is provided an aerial vehicle including a vehicle body and a landing gear disposed on the vehicle body. The landing gear includes a fixing mechanism disposed on the vehicle body, a driving mechanism disposed on the fixing mechanism, a translating member connected to the driving mechanism and configured to move relative to the fixing mechanism when being driven by the driving mechanism, and two supporting feet disposed opposite to each other. The two supporting feet are pivotedly connected to the fixing mechanism and movably connected at two ends of the translating member. The driving mechanism is configured to drive the two supporting feet through the translating member to rotate relative to the fixing mechanism.

In some embodiments, the landing gear further includes sliding members each connected to one of the supporting feet. The translating member includes at least one guiding groove. Each of the sliding members is inserted in one of the at least one guiding groove and is configured to slide along the one of the at least one guiding groove.

In some embodiments, the landing gear further includes two pivoting members. One end of each of the pivoting members is pivotedly connected to the fixing mechanism, and another end of the pivoting member is connected to one of the sliding members. Each of the supporting feet is pivotedly connected with the fixing mechanism through one of the two pivoting members and slidably connected with the translating member through the one of the two pivoting members and the corresponding sliding member.

In some embodiments, the fixing mechanism includes a mounting member connected to the driving mechanism and two connectors disposed at two ends of the mounting member. Each of the pivoting members is pivotally connected to one of the connectors. The translating member is disposed adjacent to the mounting member and configured to move away from or approach the mounting member when being driven by the driving mechanism.

In some embodiments, the fixing mechanism includes a supporting member and a guiding member disposed on the supporting member. The translating member is slidably sleeved on the guiding member. The driving mechanism is mounted on the supporting member and configured to drive the translating member to slide along the guiding member.

In some embodiments, the fixing mechanism further includes a mounting member connected to the driving mechanism and two connectors disposed at two ends of the mounting member. Each of the supporting feet is pivotally connected to one of the connectors. The supporting member is connected to the mounting member. The guiding member is perpendicular to the mounting member. The translating member is configured to slide along the guiding member to move away from or approach the mounting member.

In some embodiments, the driving mechanism includes a driving member disposed on the fixing mechanism, a first connecting rod disposed on the driving member, and a second connecting rod. One end of the second connecting rod is pivotedly connected with the first connecting rod and another end of the second connecting rod is pivotedly connected with the translating member.

In some embodiments, the supporting member includes a mounting portion disposed on the mounting member and two supporting portions formed at two ends of the mounting portion, respectively. The translating member is disposed between the two supporting portions. The driving member is mounted on one of the two supporting portions. The driving mechanism further includes a third connecting rod rotatably disposed on another one of the two supporting portions and a fourth connecting rod having one end pivotedly connected with the third connecting rod and another end pivotedly connected with the translating member.

In some embodiments, the driving mechanism further includes a driving member disposed on the fixing mechanism, a cam disposed on the driving member, and a reset resilient member. A peripheral wall of the cam is movably abutted on the translating member. One end of the reset resilient member is connected to the fixing mechanism and another end of the reset resilient member is connected to the translating member. The translating member is configured to abut against the peripheral wall of the cam.

In some embodiments, the driving mechanism includes a driving member disposed on the fixing mechanism, a gear disposed on the driving member, and a rack disposed on and fixed relative to the translating member and engaged with the gear.

In some embodiments, the driving mechanism includes a driving member disposed on the fixing mechanism, a lead screw connected with the driving member, and a nut sleeved on the lead screw and fixed relatively with the translating member.

In some embodiments, the driving mechanism includes a linear motor including a stator disposed on the fixing mechanism and a rotator slidably disposed on the stator and relatively fixed with the translating member. The linear motor is configured to drive the translating member to move relative to the fixing mechanism.

In some embodiments, the driving mechanism includes an air cylinder. A driving end of the air cylinder is connected with the translating member and configured to drive the translating member to move relative to the fixing mechanism.

An landing gear of an aerial vehicle in accordance with embodiments of the present disclosure utilizes one driving member to drive two supporting feet simultaneously through a transmission mechanism to expand or haled relative to a vehicle body of the aerial vehicle. Thus, the manufacturing cost of the aerial vehicle can be reduced. In addition, the weight of the whole landing gear is relatively smaller, reducing the load of the aerial vehicle when flying, improving, the cruising endurance of the aerial vehicle in the air.

NOMENCLATURE DESCRIPTIONS OF MAIN ELEMENTS

| | |
|---|---|
| landing gear | 100 |
| fixing mechanism | 10 |
| mounting member | 11 |
| supporting member | 13 |
| mounting portion | 131 |
| supporting portion | 133 |
| guiding member | 15 |
| fixing member | 17 |
| connector | 19 |
| connecting portion | 191 |
| pivoting portion | 193 |
| driving mechanism | 30 |
| driving member | 31 |
| first connecting rod assembly | 33 |
| first connecting rod | 331 |
| second connecting rod | 333 |
| second connecting rod component | 35 |
| third connecting rod | 351 |
| fourth connecting rod | 353 |
| transmission mechanism | 50 |
| translating member | 51 |
| body | 511 |
| guiding portion | 513 |
| guiding groove | 5131 |
| pivoting assembly | 53 |
| pivoting member | 531 |
| pivot | 533 |
| sliding member | 535 |
| supporting foot | 70 |

Embodiments of the present disclosure are described below in detail in connection with the above-described drawings.

DETAILED DESCRIPTION OF THE EMBODIMENTS

Figure 1:
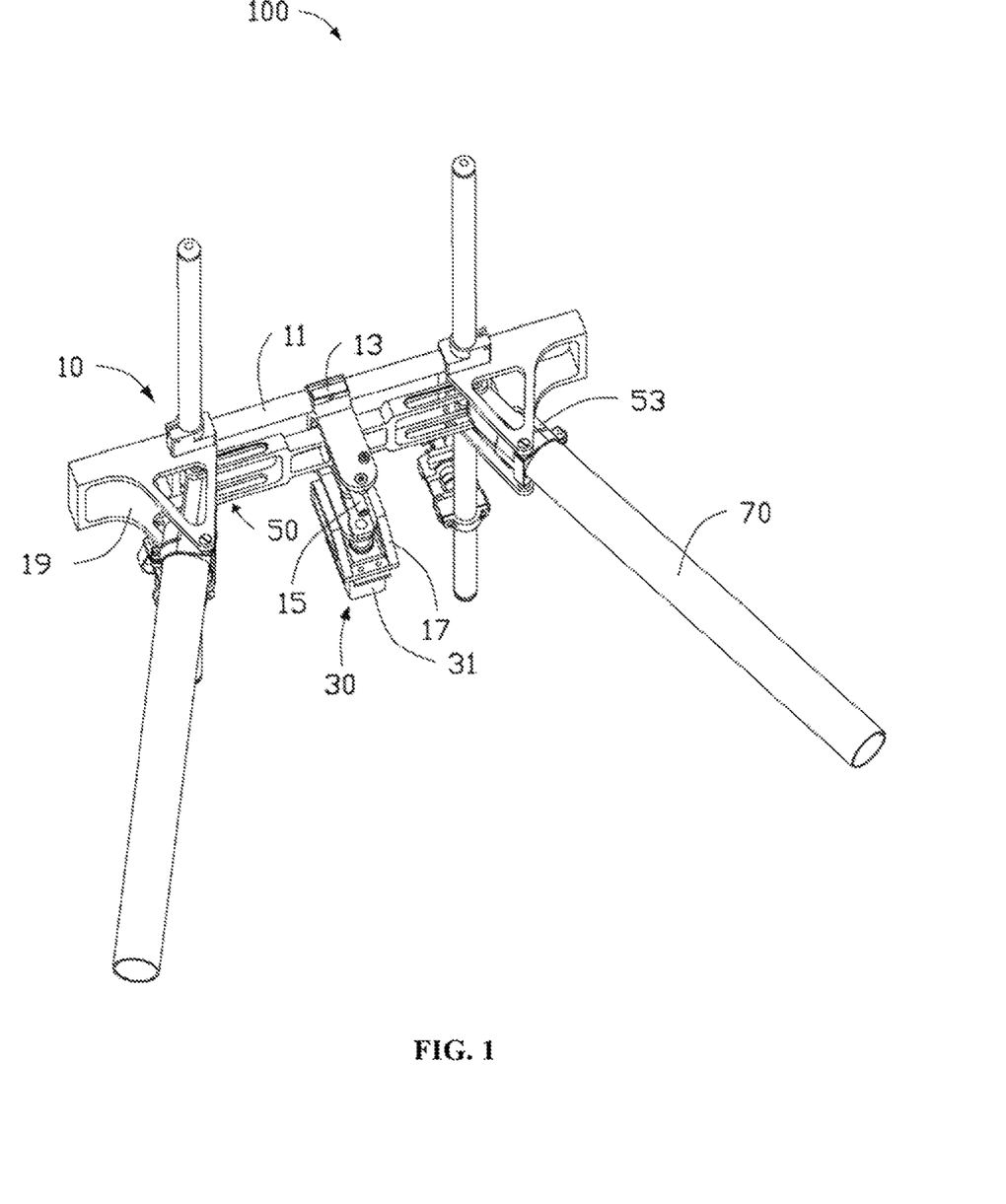
FIG. 1 is a perspective assembly schematic view of a landing near in a fast state according to an embodiment of the present disclosure.
Figure 2:
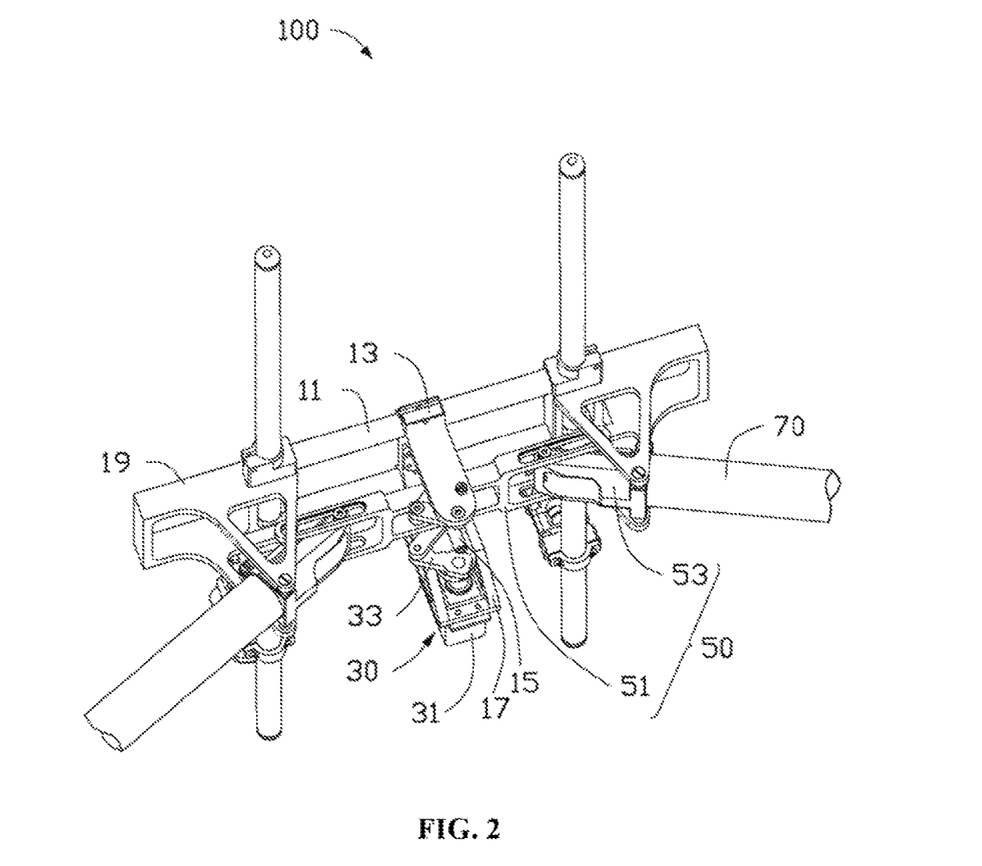
FIG. 2 is a perspective view of the landing gear shown in FIG. 1 in a second state.
Figure 3:
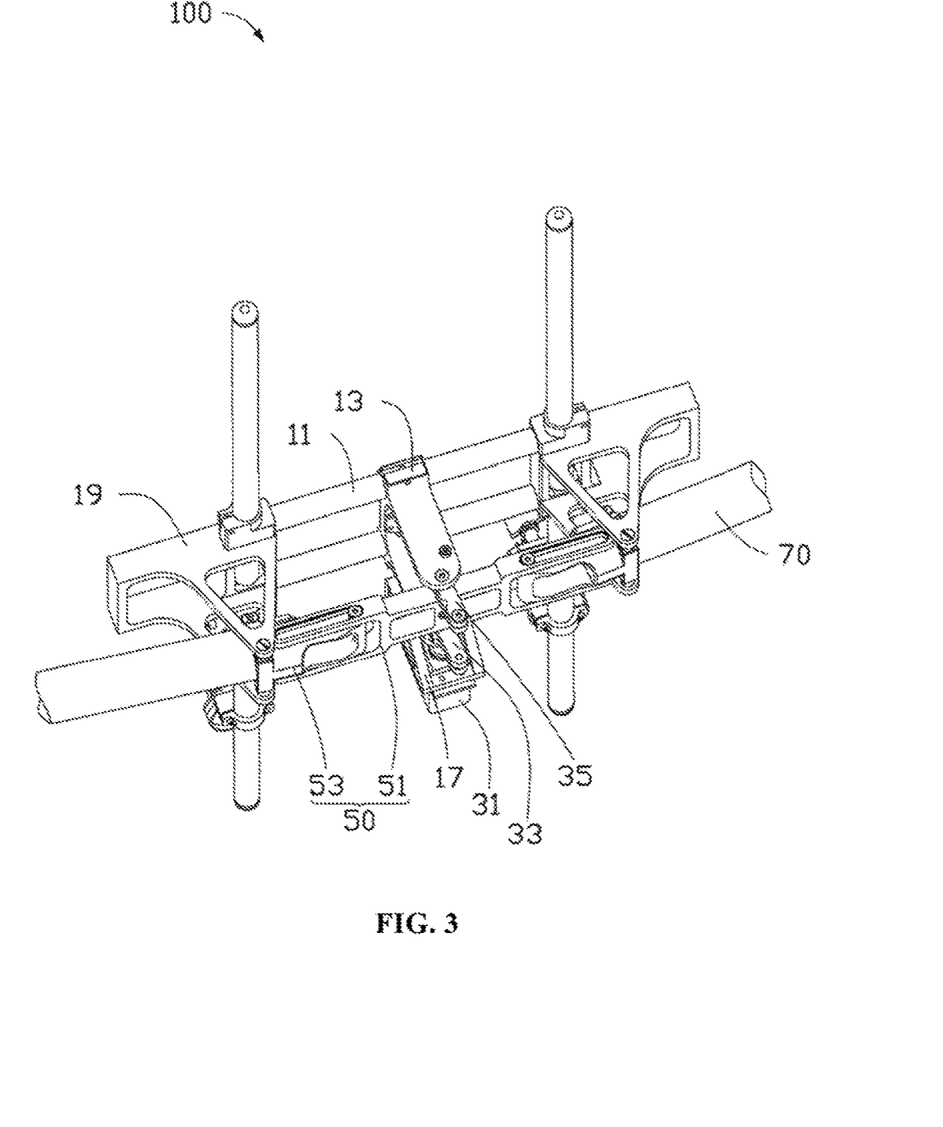
FIG. 3 is a perspective view of the landing gear shown in FIG. 1 in a third state.
Figure 4:
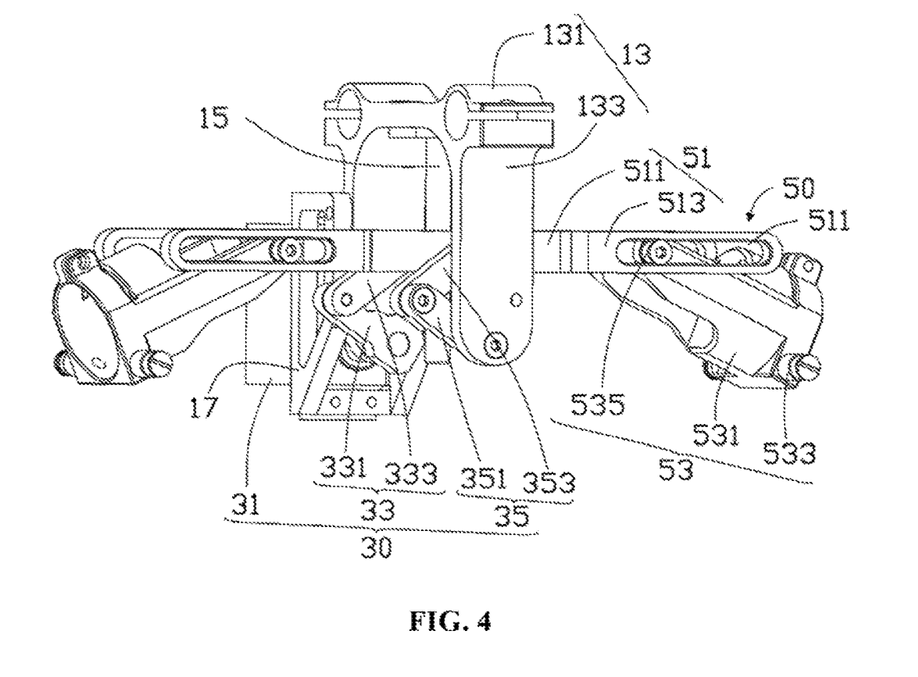
FIG. 4 is a perspective assembly schematic view of a driving mechanism and a transmission mechanism of the landing gear shown in FIG. 2.
Figure 5:
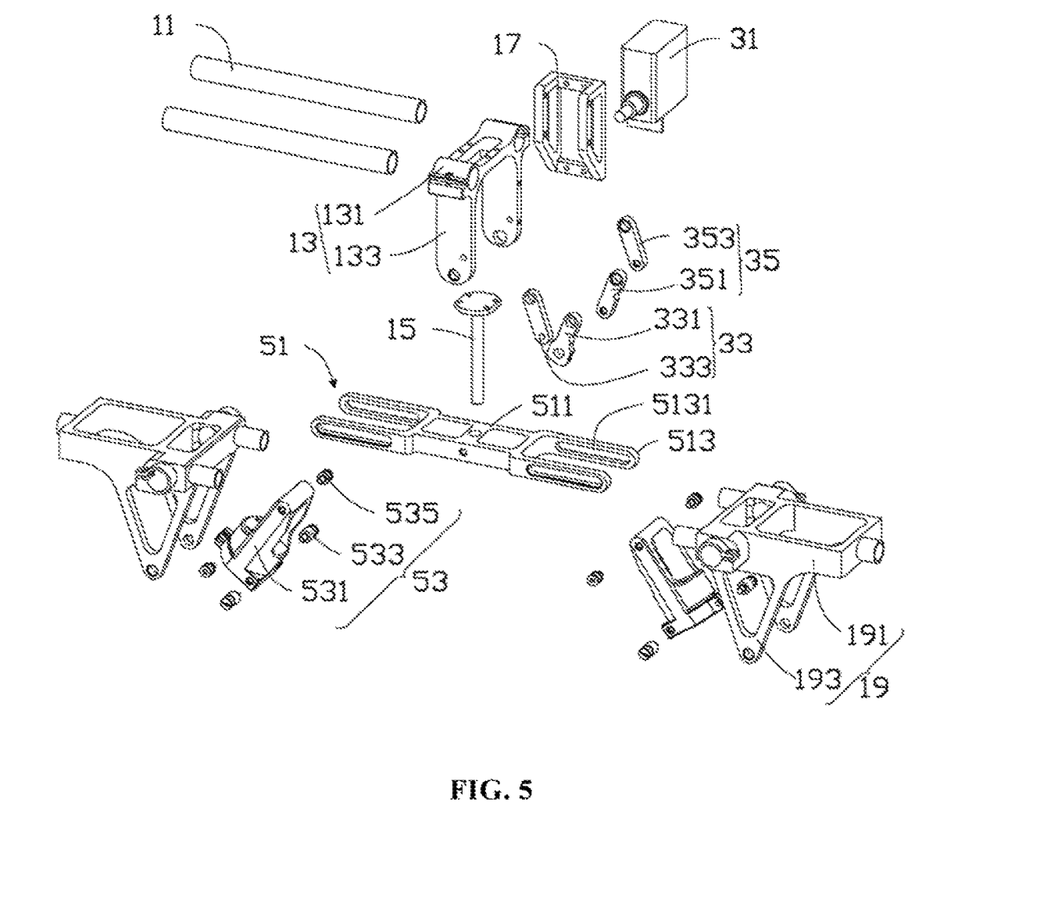
FIG. 5 is a perspective exploded schematic view of the landing gear shown in FIG. 1.

Referring to FIG. 1 to FIG. 3, a landing gear 100 in accordance with an embodiment of the present disclosure, disposed on a Vehicle body of an aerial vehicle (not illustrated), may be used as a support when the aerial vehicle is landing. The landing gear 100 may comprise a fixing mechanism 10, a driving mechanism 30 disposed on the fixing mechanism 10, a transmission mechanism 50 connected to the fixing mechanism 10, and two supporting feet 70 connected to the transmission mechanism 50. The fixing mechanism 10 may be used to be connected with the vehicle body of the aerial vehicle. The driving mechanism 30 may drive the supporting feet 70 to move through the transmission mechanism 50, so that the two supporting feet 70 may expand or fold relative to the vehicle body of the aerial vehicle.

Referring to FIG. 1 to FIG. 5, the fixing mechanism 10 may comprise at least one mounting member 11, a supporting member 13 disposed on the at least one mounting member 11, a guiding member 15 and a fixing member 17 disposed on the supporting member 13, as well as at least one connector 19 disposed on the at least one mounting member 11.

In some embodiments, as shown in the figures, two mounting members 11 may be provided and disposed approximately parallel to each other and spaced apart from one another.

The supporting member 13 may be fixedly mounted on the two mounting members 11, and comprise a mounting portion 131 and two supporting portions 133 formed at two ends of the mounting portion 131, respectively. The two ends of the mounting portion 131 may be fixedly sleeved on the two mounting members 11, respectively. Each supporting portion 133 may correspond to one mounting member 11, and protrude on the mounting portion 131 from a side of the mounting portion 131 that faces the fixing member 17 and extend along a direction approximately perpendicular to the mounting member 11.

One end of the guiding member 15 may be fixedly mounted on the mounting portion 131. The guiding member 15 may extend in a space between the two supporting portions 133. The guiding member 15 may be approximately parallel to the two supporting portions 133 for guiding and correcting a moving direction of a portion of the transmission mechanism 50.

The fixing member 17 may be fixedly disposed at one side of one supporting portion 133 that faces away from the guiding member 15, and used for mounting a portion of the driving mechanism 30.

In some embodiments, as shown in the figures, two connectors 19 may be provided. The two connectors 19 may be fixedly disposed on two ends of the mounting members 11 that are opposite to each other, and configured to be connected with the vehicle body of the aerial vehicle. The two connectors 19 may each comprise a connecting portion 191 and at least one pivoting portion 193 formed thereon. An end of the connecting portion 191 may be fixedly connected on the mounting members 11, the other end may be connected with the vehicle body of the aerial vehicle. In some embodiments, as shown in the figures, two pivoting portions 193 for each connector may be provided. The two pivoting portions 193 may protrude on the corresponding connecting portion 191 from a side of the connecting portion 191 that faces the feet 70 and extend along a direction approximately perpendicular to the connecting portion 191. The two pivoting portions 193 may be spaced apart from each other for mounting a portion of the transmission mechanism 50.

The driving mechanism 30 may be connected on the supporting member 13 and configured to drive the transmission mechanism 50 to move. The driving mechanism 30 may comprise a driving member 31, a first connecting rod assembly 33, and a second connecting rod assembly 35.

In some embodiments, the driving member 31 is a steering engine, and mounted at one side of the fixing member 17 that faces away from the guiding member 15. A driving end of the driving member 31 may be inserted through the fixing member 17 and the corresponding supporting portion 133, and protrude between the two supporting portions 133.

The first connecting rod assembly 33 may be located between the two supporting portions 133 and disposed adjacent to one of the two supporting portions 133. The first connecting rod assembly 33 may comprise a first connecting rod 331 and a second connecting rod 333 connected with the first connecting rod 331. One end of the first connecting rod 331 may be connected on the driving end of the driving member 31. One end of the second connecting rod 333 may be rotatably connected at another end of the first connecting rod 331 away from the driving member 31. The other end of the second connecting rod 333 may be configured to connect the transmission mechanism 50. The driving member 31 may be capable of driving the first connecting rod 331 to rotate, thereby causing the first connecting rod 331 to drive the second connecting rod 333 so as to drive the transmission mechanism 50 to rotate. In some embodiments, a maximum rotating angle of the driving end of the driving member 31 may be approximately 180 degree.

The second connecting rod, assembly 35 may be disposed adjacent to the other one of the two supporting portions 133.

The structure of the second connecting rod assembly 35 may be approximately the same as the structure of the first connecting rod assembly 33. Specifically, the second connecting rod assembly 35 may comprise a third connecting rod 351 and a fourth connecting rod 353 connected with the third connecting rod 351. One end of the third connecting rod 351 may be rotatably connected the on corresponding supporting portion 133, and the other end may be pivotedly connected with the fourth connecting rod 353.

The transmission mechanism 50 may be connected to the driving mechanism 30, and comprise a translating, member 51 and two pivoting assemblies 53.

The translating member 51 may be disposed between the two supporting portions 133, connected with the first connecting rod assembly 33 and the second connecting rod assembly 35, and approximately parallel to the mounting members 11. The translating member 51 may comprise a body 511 and a guiding portion 513 formed on the body 511. The body 511 may be movably sleeved on the guiding member 15. Two sides of the body 511 that are opposite to each other may be pivotely connected with the second connecting rod 333 and the fourth connecting rod 353, respectively. In some embodiments, as shown in the figures, four guiding portions 513 may be provided. The four guiding portions 513 may be formed at four corners of the guiding member 15, respectively, and extend along a direction parallel to the mounting members 11. The four guiding portions 513 may be divided into two groups each comprising two of the guiding portions 513. The two groups of guiding portions 513 may be disposed adjacent to the two connectors 19, respectively. The two guiding portions 513 in each group may be disposed parallel to and spaced apart from each other. A guiding groove 5131 may be provided on and through each guiding portion 513. The guiding groove 5131 may be a strip-shaped slot and extend alone a direction approximately parallel to the mounting members 11. When the driving member 31 drives the first connecting rod 331 to rotate, the first connecting rod 331 may drive, the body 511 to translate, i.e., move translationally, along a lengthwise direction of the guiding member 15 through the second connecting rod 333, to cause the translating member 51 to move as a whole along a direction approximately perpendicular to the mounting members 11, thereby, causing the translating member 51 to be relatively far away or close to the mounting members 11.

The two pivoting assemblies 53 may be pivotely connected to on the two connectors 19, respectively. Each of the two pivoting assemblies 53 may comprise a pivoting member 531, and a pivot 533 and sliding members 535 disposed on two ends of the pivoting member 531, respectively.

The pivoting member 531 may be disposed between corresponding two pivoting portions 193. One end of the pivoting member 531 may be connected rotatably to the pivoting portions 193 through the pivot 533. In some embodiments, as shown in the figures, two sliding members 535 may be provided. The two sliding members 535 may be disposed at the other end of the pivoting member 531 that is away from the pivot 533, and located at two sides of the pivoting member 531. Each sliding member 535 may be slidably inserted in a corresponding guiding groove 5131, connecting the corresponding pivoting member 531 and the translating member 51 with a certain included angle between the pivoting member 531 and the translating member 51. When the translating member 51 is driven by the driving mechanism 30 to approach or move away from the mounting members 11, the translating member 51 may be capable of driving the pivoting members 531 to rotate about the corresponding pivots 533 through the guiding portions 513 and the guiding grooves 5131. At the same time, the sliding members 535 may slide within the guiding grooves 5131, thereby changing an included angle between each of the pivoting members 531 and the translating member 51.

The supporting feet 70 may be approximately rod-shaped and disposed on the transmission mechanism 50. Each supporting foot 70 may be inserted fixedly at one end of one pivoting member 531 away from the translating member 51, and disposed at a certain angel with respect to the translating member 51. When the driving member 31 drives the translating member 51 to approach or move away from the mounting members 11, the supporting feet 70 may, be driven by the corresponding pivoting member 531 about the corresponding pivots 533, changing the included angle between each of the supporting feet 70 and the translating member 51. As such, the two supporting feet 70 can be expanded or folded.

When the landing gear 100 is assembled, the supporting member 13 and the connectors 19 may be mounted on the mounting members 11 first. Then the guiding member 15 and the fixing member 17 may be mounted on the supporting member 13. Further, the driving member 31 may be amounted on the fixing member 17. The first connecting rod 331 of the first connecting rod assembly 33 may be connected with the driving end of the driving member 31. The second connecting rod assembly 35 may be mounted on the supporting member 13. Then the translating member 51 may be disposed between the two supporting portions 133 and pivotely connected with the first connecting rod assembly 33 and the second connecting rod assembly 35. Then, for each of the pivoting assembly 53, one end of the pivoting member 531 may be connected to the translating member 51 through the sliding member 535, and the other end, of the pivoting member 531 may be pivotely connected to the corresponding connector 19 through the pivot 533. Finally, the supporting feet 70 may be fixedly inserted into the corresponding pivoting members 531.

When the landing gear 100 operates, the driving member 31 may drive the first connecting rod 331 to rotate. Through the second connecting rod 333, the first connecting rod 331 may drive the translating member 51 to slide along the guiding member 15. Consequently through the corresponding sliding members 535, the guiding grooves 5131 of the translating member 51 may force the corresponding pivoting members 531 and the corresponding supporting feet 70 to rotate about corresponding pivots. In some embodiments, the driving member 31 may be a steering engine, whose maximum driving angle may be 180 degree. When the driving member 31 drives the first connecting rod 331 to rotate to a first extreme position relatively close to the mounting, members 11 (as shown in FIG. 1), the first connecting rod 331 and the second connecting rod 333 may be aligned one after another and approximately along, a same line. At this time, the translating member 51 may be relatively close to the mounting members 11, and the guiding portion 513 may cause each of the supporting feet 70 to form a minimum included angle with the translating member 51. That is, at this time, the two supporting feet 70 may be in an expanded state and form a "V" shape. When the driving member 31 drives the first connecting rod 331 to rotate to a second extreme position relatively far away from the mounting members 11 (as shown in FIG. 3), the first connecting rod 331 and the second connecting 333 may be parallel to and face each other. At this time, the translating member 51 may be relatively far away from the mounting members 11, and the guiding portion 513 may cause each of the supporting feet 70 to form a maximum included angle with the translating member 51. In some embodiments, the maximum included angle may be approximately 180 degree. That is, at this time, the two supporting feet 70 may be in a folded state and disposed at two ends of the translating member 51. In some other embodiments, the maximum included angle may be greater than 180 degree.

The present disclosure may also provide an aerial vehicle (not illustrated) comprising a vehicle body and the landing gear 100 as described above. The landing gear 100 may be mounted on the vehicle body through the at least one connector 19. The vehicle body may comprise, a propulsion mechanism for driving the aerial vehicle to fly and an electronic control module for controlling the propulsion mechanism. The propulsion mechanism may include a motor and at least one rotor. When the aerial vehicle flies, the two support feet 70 of the landing gear 100 may be in a folded state and disposed alongside the vehicle body. When the aerial vehicle lands, the two support feet 70 may expand and form a "V" shape with each other. In some embodiments, the aerial vehicle may be a rotatory-wing aerial vehicle, and used for carrying a video camera to perform aerial photography. Specifically, a gimbal (not illustrated) may be mounted on the landing gear 100. An image capturing device (not illustrated), such as a video camera or a camera, may be disposed on the gimbal, such that the aerial vehicle can be used in the field of aerial photography and the like. It should be understood that an aerial vehicle may be used for performing other work such as map surveying, disaster investigating and rescuing, aerial monitoring, power line patrolling and the like. Likewise, it should be understood that the aerial vehicle may also be a fixed wing aerial vehicle.

The landing gear 100 for an aerial vehicle according to the present disclosure utilizes one driving member 31 to drive two supporting feet 70 simultaneously through the transmission mechanism 50 to expand or fold relative to a vehicle body of the aerial vehicle. Thus, the manufacturing cost of the aerial vehicle can be reduced. In addition, the weight of the whole landing gear 100 is relatively small, reducing the load of the aerial vehicle when flying, improving the cruising endurance of the aerial vehicle in the air.

In the embodiments described above, the driving member 31, the first connecting rod 331, the second connecting rod 333, and the translating member 51 may collectively constitute one crank-slider mechanism. The driving member 31 may rotate and cause the first connecting rod 331 and the second connecting rod 333 to drive the translating member 51 move translationally. It should be understood that, the driving mechanism 30 may be a transmission mechanism other than the crank-slider mechanism, so long as the driving mechanism 30 can drive the translating member 51 to move away from or approach the mounting members 11, thereby causing the two support feet 70 to fold or expand.

In some other embodiments, the driving mechanism 30 may be a lead screw-nut mechanism. In these embodiments, the driving member 31 may be an electric motor, the first connecting rod 331 may be designed as a lead screw, and the second connecting rod 333 may be designed as a nut matching the lead screw. Specifically, the lead screw-nut mechanism may comprise an electric motor, a lead screw, and a nut. The electric motor may be fixedly mounted on the fixing mechanism 10. The lead screw may be connected with the electric motor and approximately parallel to the guiding member 15. The nut may be sleeved on the lead screw and fixedly connected with the translating member 51. When the electric motor drives the lead screw to rotated, the lead screw may drive the translating member 51 through the nut to move away from or approach the mounting members 11, thereby driving the two support feet 70 to fold or expand.

In some other embodiments, the driving mechanism 30 may be a cam mechanism. In these embodiments, the first connecting rod 331 may be designed in a cam form, and the second connecting rod 333 may be omitted. Specifically, the cam mechanism may comprise the driving member 331, a cam, and a reset resilient member. The cam may be connected with the driving end of the driving member 31. A peripheral wall of the cam may movable abut on the translating member 51. One end of the reset resilient member may be connected to a fixing mechanism 10, and the outer end of the reset resilient member may be connected to the translating member 51 to provide a restoring force to the translating member 51, causing the translating member 51 to always abut against the peripheral wall of the can when moving. When the driving member 31 drives the rotate, the outer peripheral wall of the cam may push against the translating member 51 to move away from or approach the mounting members 11, thereby driving the two support feet 70 to fold or expand.

In some other embodiments, the driving mechanism 30 may be a gear-rack mechanism. In these embodiments, the first connecting rod 331 may be designed as a gear, and the second connecting rod 333 may be designed as a rack engaging with the gear. Specifically, the gear-rack mechanism may comprise the driving member 31, a gear, and a rack. The gear may be mounted at the driving end of the driving member 31, and an axis of the gear may be substantially perpendicular to the mounting members 11. The rack may be mounted on the translating member 51, and fixed relative to the translating member 51. The gear and the rack may be engaged with each other. When the driving member 31 drives the gear to rotate, the gear may drive the translating member 51 through the rack to move away from or approach the mounting members 11, thereby driving the two supporting feet 70 to fold or expand.

In some other embodiments, the driving mechanism 30 may be a linear motor. Specifically, the driving mechanism 30 may comprise a stator fixed on the fixing mechanism 10 and a rotator disposed slidably on the stator. The rotator may be fixed relatively with the translating member 51, and may drive the mounting member 51 to move away from or approach the mounting members 11, thereby driving the two supporting feet 70 to fold or expand.

In some other embodiments, the driving mechanism 30 may be an air cylinder configured to move back and forth in a straight line. A driving end of the air cylinder may be fixed relatively with the translating member 51, which may move away from or approach the mounting members 11 when being driven by the air cylinder, thereby driving the two supporting feet 70 to fold or expand.

It should be understood that the fixing member 17 may be omitted, and when the landing gear 100 is assembled, the driving mechanism 30 may be mounted directly on the supporting member 13.

It should be understood that the mounting members 11, the supporting member 13, the guiding member 15, the fixing member 17, and the connectors 19 of the fixing mechanism 10 may be assembled together to form the complete fixing mechanism 19, or may be formed integrally as a fixing seat, and when the landing gear 100 is assembled, the driving mechanism 30 and the transmission mechanism 50 may be mounted on the fixing seat.

It should be understood that the second connecting rod assembly 35 may be omitted, and when the landing gear 100 is assembled, the translating member 51 may be connected to the driving mechanism 30 through the first connecting rod assembly 33 only.

It should be understood that the pivoting member 531 may be omitted, and when the landing gear 100 is assembled, the supporting feet 70 may be pivotedly connected with the connectors 19 through the pivots 533, and the sliding members 535 may each be fixed at an end of the corresponding support foot 70 and disposed slidably within the corresponding guiding grooves 5131. As such, the two supporting feet 70 may be capable of folding or expanding relatively when the driving member 31 drives the translating member 51 to move away from or approach the mounting members 11. Likewise, it should be understood that, the sliding members 535 may be formed integrally on the corresponding support feet 70, respectively.

In addition, other variations can be made by those skilled in the art within the spirit of the present disclosure. Of course, these variations as made in accordance with the spirit of the present disclosure shall be included within the scope of the present disclosure.

What is claimed is:

1. A landing gear comprising:
a holder;
a driver disposed on the holder;
a translation block connected to the driver and driven to move relative to the holder by the driver;
two supporting feet disposed opposite to each other, the two supporting feet being pivotally connected to the holder and movably connected at two ends of the translation block; and
sliding nuts each connected to one of the two supporting feet,
wherein:
the translation block includes at least one guiding groove,
each of the sliding nuts is inserted in one of the at least one guiding groove and has a linear movement along the one of the at least one guiding groove, and
the driver is connected to the two supporting feet through the translation block and drives the two supporting feet to rotate relative to the holder, rotations of the two supporting feet being based on positions of the sliding nuts relative to the holder.

2. The landing gear of claim 1, further comprising:
two pivoting joints, one end of each of the pivoting joints being pivotally connected to the holder, another end of the pivoting joint being connected to one of the sliding nuts,
wherein each of the supporting feet is pivotally connected with the holder through one of the two pivoting joints member and slidably connected with the translation block through the one of the two pivoting joints and the corresponding sliding nut.

3. The landing gear of claim 2, wherein:
The holder comprises a mounting frame connected to the driver and two connectors disposed at two ends of the mounting frame,
each of the pivoting joints is pivotally connected to one of the connectors, and
the translation block is disposed adjacent to the mounting frame and driven to move away from or approach the mounting frame by the driver.

4. The landing gear of claim 1, wherein:
the holder comprises a supporting clamp and a guiding rod disposed on the supporting clamp,
the translation block is slidably sleeved on the guiding rod, and
the driver is mounted on the supporting clamp and drives the translation block to slide along the guiding rod.

5. The landing gear of claim 4, wherein:
the holder further comprises a mounting frame connected to the driver and two connectors disposed at two ends of the mounting frame,
each of the supporting feet is pivotally connected to one of the connectors,
the supporting clamp is connected to the mounting frame,
the guiding rod is perpendicular to the mounting frame, and
the translation block is driven to slide along the guiding rod to move away from or approach the mounting frame.

6. The landing gear of claim 4, wherein the driver comprises:
an electric motor disposed on the holder;
a first connecting rod disposed on the electric motor; and
a second connecting rod, one end of the second connecting rod being pivotally connected with the first connecting rod and another end of the second connecting rod being pivotally connected with the translation block.

7. The landing gear of claim 6, wherein:
the supporting clamp comprises a mounting sleeve portion disposed on the mounting frame and two supporting walls formed at two ends of the mounting sleeve, respectively,
the translation block is disposed between the two supporting walls,
the electric motor is mounted on one of the two supporting walls, and
the driver further comprises:
a third connecting rod rotatably disposed on another one of the two supporting walls; and
a fourth connecting rod having one end pivotally connected with the third connecting rod and another end pivotally connected with the translation block.

8. An aerial vehicle comprising:
a vehicle body; and
at least one landing gear disposed on the vehicle body, the at least one landing gear comprising:
a holder disposed on the vehicle body;
a driver disposed on the holder;
a translation block connected to the driver and driven to move relative to the holder by the driver;
two supporting feet disposed opposite to each other, the two supporting feet being pivotally connected to the holder and movably connected at two ends of the translation block; and
sliding nuts each connected to one of the two supporting feet,
wherein:
the translation block includes at least one guiding groove,
each of the sliding nuts is inserted in one of the at least one guiding groove and has a linear movement along the one of the at least one guiding groove, and
the driver is connected to the two supporting feet through the translation block and drives the two supporting feet to rotate relative to the holder, rotations of the two supporting feet being based on positions of the sliding nuts relative to the holder.

9. The aerial vehicle of claim 8, wherein the at least e landing gear further comprises:

two pivoting joints, one end of each of the pivoting joints being pivotally connected to the holder, another end of the pivoting joint being connected to one of the sliding nuts, wherein each of the supporting feet is pivotally connected with the holder through one of the two pivoting joints and slidably connected with the translation block through the one of the two pivoting joints and the corresponding sliding nut.

10. The aerial vehicle of claim 9, wherein:

the holder comprises a mounting frame connected to the driver and two connectors disposed at two ends of the mounting frame, each of the pivoting joints is pivotally connected to one of the connectors, and the translation block is disposed adjacent to the mounting frame and driven to move away from or approach the mounting frame when being driven by the driver.

11. The aerial vehicle of claim 8, wherein:

the holder comprises a supporting clamp and a guiding rod disposed on the supporting clamp, the translation block is slidably sleeved on the guiding rod, and the driver is mounted on the supporting clamp member and drives the translation block to slide along the guiding rod.

12. The aerial vehicle of claim 11, wherein:

the holder further comprises a mounting frame connected to the driver and two connectors disposed at two ends of the mounting frame, each of the supporting feet is pivotally connected to one of the connectors, the supporting clamp is connected to the mounting frame, the guiding rod is perpendicular to the mounting frame member, and the translation block is driven to slide along the guiding rod to move away from or approach the mounting frame.

13. The aerial vehicle of claim 11, wherein the drive comprises:

an electric motor disposed on the holder;

a first connecting rod disposed on the electric motor; and a second connecting rod, one end of the second connecting rod being pivotally connected with the first connecting rod and another end of the second connecting rod being pivotally connected with the translation block.

14. The aerial vehicle of claim 13, wherein:

the supporting clamp comprises a mounting sleeve disposed on the mounting frame and two supporting walls formed at two ends of the mounting sleeve, respectively, the translation block is disposed between the two supporting walls, the electric motor driving-member is mounted on one of the two supporting walls, and the driver further comprises:

a third connecting rod rotatably disposed on another one of the two supporting walls; and a fourth connecting rod having one end pivotally connected with the third connecting rod and another end pivotally connected with the translation block.

* * * * *